E. MILLER.
FELLY TIGHTENER.
APPLICATION FILED APR. 1, 1914.
1,142,903.
Patented June 15, 1915.
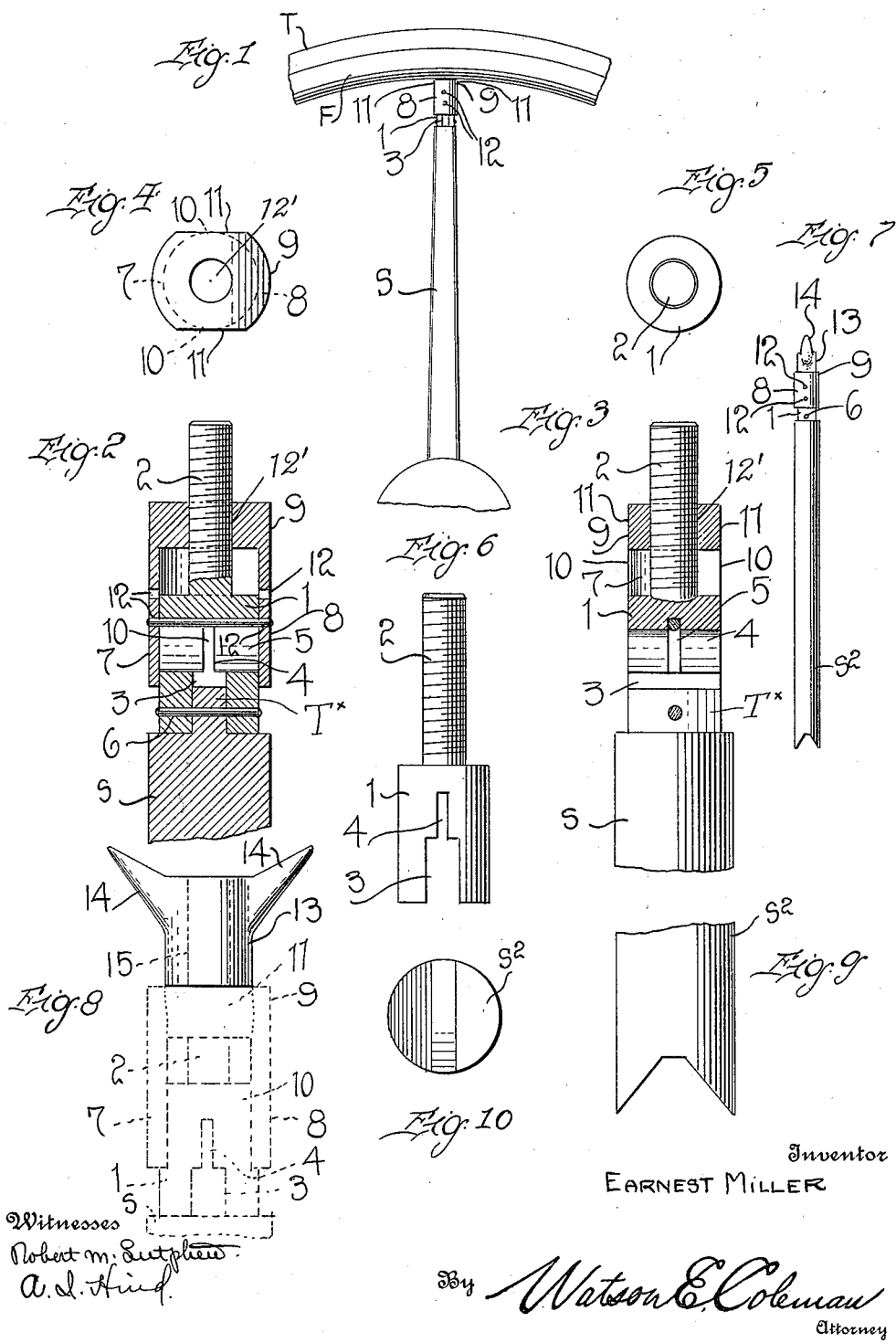
Inventor
EARNEST MILLER

UNITED STATES PATENT OFFICE.

EARNEST MILLER, OF KOKOMO, INDIANA.

FELLY-TIGHTENER.

1,142,903.  Specification of Letters Patent.  Patented June 15, 1915.

Application filed April 1, 1914.  Serial No. 828,845.

*To all whom it may concern:*

Be it known that I, EARNEST MILLER, a citizen of the United States, residing at Kokomo, in the county of Howard and State of Indiana, have invented certain new and useful Improvements in Felly-Tighteners, of which the following is a specification, reference being had to the accompanying drawings.

This invention relates to felly tighteners.

The object of the invention is, in a ready, practical and effective manner to tighten the felly so as to cause it positively to impinge against the tire, thus to take up any play that may exist between the parts, and further to compensate for any looseness that may exist between the outer ends of the spokes and the felly, whereby without removing the tire, the felly and spokes may be as securely assembled while the parts of the wheel remain intact as when the wheel was first constructed.

With the above and other objects in view as will appear as the nature of the invention is better understood, the same consists, generally stated, in a felly tightener embodying a felly expanding member and a spoke extending member, the two being carried by the outer end of a spoke. The spoke extending member comprises a socketed head and a threaded shank, the former of which is to be assembled with the outer end of a spoke and the latter to project into the spoke tenon opening already provided in the felly. The felly expanding member comprises a split sleeve and a nut, the sleeve being designed to inclose and telescope with the head of the spoke extending member, and the nut to engage the threaded shank thereof, the nut being provided with a wrench face whereby to permit of its being turned thus to force the outer face of the nut into engagement with the felly and expand the same.

Further and more specific details of construction will be hereinafter fully described and claimed.

In the accompanying drawings, forming a part of this specification, and in which like characters of reference indicate corresponding parts, Figure 1 is a view in side elevation showing the felly tighteners of the present invention combined with a spoke; Fig. 2 is an enlarged detail sectional view of the tightener removed from the hub and felly; Fig. 3 is a view similar to Fig. 2 but taken at right angles thereto; Fig. 4 is a top plan view of the tightening nut of the structure; Fig. 5 is a top plan view of the spoke expanding member; Fig. 6 is a view in side elevation of the spoke expanding member; Fig. 7 is a view in side elevation displaying the manner in which the felly tightener is employed to cause it to operate a jack; Fig. 8 is an enlarged detail view, partly in dotted lines, showing the arrangement of the felly tightener in actuating the jack head; Fig. 9 is a view in side elevation of the lower portion of the jack staff; and Fig. 10 is a top view in plan of the top of the spoke staff.

Referring to the drawings, F designates the felly of an ordinary vehicle wheel, T the tire thereof, and S the spokes, and as these parts may be of the usual or any preferred construction, further description is deemed unnecessary.

The gist of the invention resides in the novel form of means whereby when a spoke has become loosened in the felly, from any cause, or the felly works loose in the tire, the looseness of both parts may readily be taken up, thus to cause the tire and felly to be as tightly assembled with the spokes, as when the wheel was first constructed.

The tightener comprises a spoke extending member comprising a socketed or mortised head 1, and a threaded shank 2, the two parts being preferably integral. The head is provided in its inner end with an all-through socket or slot 3 extending from the upper wall of which is a transverse slot 4, and disposed at right angles to the slot 4 are two closed-ended slots 5 below which, on each side of the head and disposed in alinement is an orifice 6. The shank 2 is shown as threaded, and will be of a size to fit within the opening in the felly occupied by the spoke tenon, it being understood that this article is to be made in standard sizes so as to be applicable to vehicles of different makes.

The sleeve expanding member comprises a split sleeve embodying two segmental arms 7 and 8 and a nut 9 constituting one end of the member, the sides of the nut in alinement with the slots 10 in the sleeve being flattened to provide wrench faces 11, whereby the expanding member may readily be turned by an ordinary wrench. Each of the arms is provided with two orifices 12 disposed in longitudinal and transverse alinement, and the nut is provided at its center with a threaded opening 12' to engage with the shank 2.

When the tenon of a spoke has been broken off, or it is desired to equip the end of a spoke with the tightener, the spoke is turned to one side a sufficient distance to permit the threaded shank 2 to be loosely mounted within the tenon opening. The outer end of the spoke is then shaped to engage with the socket 3, and the head 1 will be held assembled with the tenon $T^x$ on the spoke by a pin 6 passing entirely through the head. Previous to assembling the shank with the tenon, the expanding member is secured onto the shank, and houses the head of the extending member. A wrench is now applied to the nut, and the latter is turned, forcing the outer face of the nut into engagement with the felly, and thus expanding the latter. After the expanding member has been adjusted to the proper degree, pins may be passed through the orifices 12 and either of the slots 4 or 5 and thus securely hold the expanding member from having any rotary movement on the extending member.

It is to be understood that each spoke of a vehicle wheel may be equipped with a tightener, or only such of those as may have become shortened and thus cause the felly to be loose on one side of the wheel.

Should it be desired merely to insert leather or other washers between the outer of the spokes and the felly to tighten a loose spoke, the tightener may be converted into an expanding jack, by assembling the head with a length of spoke $S^2$ taken from another vehicle, and disposing upon the shank a jack head 13 having laterally extending arms 14 that are dished to form a seat to bear against the inner face of the felly, the jack head being provided with a longitudinal bore 15 to fit loosely on the shank. When the washers referred to are to be interposed between the outer face of the spoke and the inner face of the felly the jack head will be placed against the inner face of the felly and the spoke section carried by the head of the expanding member will bear against the hub. Upon the expanding member being turned by a wrench in the manner described, the felly will be forced outward, and the washers may then be positioned, after which the jack will be removed.

From the foregoing description it will be seen that although the structure of this invention is exceedingly simple in character, that it will be thoroughly efficient for the purposes designed, and may be employed to repair wheels without the necessity of skilled mechanical labor for the purpose.

Having thus described my invention, what I claim is:

1. A felly tightener comprising a head provided with a longitudinally disposed socket and having a screw-threaded shank projecting therefrom, said head being also provided with alined orifices adjacent the open end thereof, the intermediate portion of the head being provided with intersecting slots, a sleeve having one end closed adapted to telescopically engage the head, the closed end of the sleeve having a central screw-threaded opening adapted to be adjustably mounted upon the screw-threaded shank, said sleeve having alined orifices adapted to register with the slots in the head, and a pin insertible through a slot of the head and the registering orifices in the sleeve.

2. A felly tightener comprising a head provided in one end with a longitudinally disposed socket, intersecting slots disposed through the head adjacent the base of the socket, a threaded shank projecting from the head, a nut in threaded engagement with the shank and having arms overlying the head, said arms being provided with alined orifices, and locking means adapted to be inserted through the orifices in the arms and a slot of the head.

In testimony whereof I hereunto affix my signature in the presence of two witnesses.

EARNEST MILLER.

Witnesses:
N. B. SMITH,
JAMES MILLER.

Copies of this patent may be obtained for five cents each, by addressing the "Commissioner of Patents, Washington, D. C."